United States Patent [19]
Murray et al.

[11] Patent Number: 5,842,750
[45] Date of Patent: Dec. 1, 1998

[54] COMPOSITE STYLED WHEEL AND METHOD AND APPARATUS FOR MAKING THE SAME

[75] Inventors: Scott L. Murray, East Lansing, Mich.; Paul N. Skotynsky, Oregon, Ohio; Richard J. Ashman, Bowling Green, Ky.

[73] Assignee: Uretech International, Inc., Luckey, Ohio

[21] Appl. No.: 655,564

[22] Filed: May 30, 1996

[51] Int. Cl.$^6$ .................................................... B60B 7/00
[52] U.S. Cl. ...................................... 301/37.43; 301/37.1
[58] Field of Search ............................. 301/37.1, 37.42, 301/37.43

[56] References Cited

U.S. PATENT DOCUMENTS

| | | |
|---|---|---|
| 1,976,740 | 10/1934 | McChesney . |
| 2,027,165 | 1/1936 | Grubman . |
| 3,677,677 | 7/1972 | Coppola . |
| 3,981,671 | 9/1976 | Edwards . |
| 4,017,239 | 4/1977 | O'Connell et al. . |
| 4,251,476 | 2/1981 | Smith . |
| 4,976,497 | 12/1990 | Post et al. ............... 301/37.43 |
| 5,088,798 | 2/1992 | Stalter, Sr. et al. ........... 301/37.42 |
| 5,098,272 | 3/1992 | Joseph et al. ............... 301/37.42 X |
| 5,143,426 | 9/1992 | Todd ........................ 301/37.43 |
| 5,595,423 | 1/1997 | Heck et al. ................. 301/37.43 |

FOREIGN PATENT DOCUMENTS

2521441  11/1976  Germany .............. 301/37.43

*Primary Examiner*—Russell D. Stormer
*Attorney, Agent, or Firm*—MacMillan, Sobanski & Todd, LLC

[57] ABSTRACT

A composite styled wheel has a rigid wheel backbone with a plastic overlay on an outboard face thereof. The wheel backbone is positioned in a lower mold to define a mold cavity therebetween, and an upper mold seals through apertures in the wheel backbone. The lower mold has a ring-shaped forming surface that selectively abuts the outboard flange edge of the wheel backbone, and a riser which selectively engages the wheel backbone, and selectively positions the outboard flange edge a spaced apart distance from the forming surface to define a venting space therebetween. A reactive urethane mixture is injected into the mold cavity to fill at least a portion of the same, and flow the mixture through the venting space to evacuate air from the mold cavity. Before the mixture is fully cured, the riser is actuated, the wheel backbone and lower mold are converged, so that the outboard flange edge abuts the forming surface to seal off the venting space, and form over at least a portion of the outboard flange edge, a smooth, skinned, mold-formed outer portion of the plastic overlay.

13 Claims, 12 Drawing Sheets

COMPOSITE STYLED WHEEL AND METHOD AND APPARATUS FOR MAKING THE SAME

BACKGROUND OF THE INVENTION

The present invention relates to composite styled wheels for use on automobile passenger vehicles, pick-up trucks, and the like, and in particular to a plastic overlay therefor having a mold-formed outer edge, as well as an associated method and apparatus for making the same.

Composite styled wheels were developed by Motor Wheel Corporation, and their predecessors, assignee of the present application, during the late 1960's and early 1970's, and are currently being marketed under the "POLYCAST" trademark. Such styled wheels use as a backbone, a conventional automotive type wheel, with a conventual configuration for which manufacturing equipment is already available. The backbone provides to the composite wheel a high strength, standardized wheel construction at minimum cost. An aesthetically pleasing appearance is imparted to the standard metal wheel backbone by permanently adhering an ornamental plastic overlay to the outboard face thereof. The plastic overlay improves anti-noise characteristics of the wheel, and enables the appearance of the wheel to be readily and economically varied to suit different customer styling requirements, without varying the basic structural components of the wheel. Examples of such wheels, along with associated methods for making the same, are exemplified in Motor Wheel U.S. Pat. Nos. 3,762,677 to Adams, 5,059,106 to Joseph and 5,088,798 to Stalter Sr., et al, each of which is hereby incorporated herein by reference.

Heretofore, "Polycast" brand wheels have been constructed by placing a conventional metal vehicle wheel directly in a lower mold, so that the outboard flange edge of the wheel backbone firmly abuts a fixed, ring-shaped forming surface on the lower mold. An upper mold is positioned over the wheel backbone to seal off through apertures in the wheel backbone. The upper mold, the wheel backbone and the lower mold are then locked together to prevent inadvertent separation of the same during injection of the mold cavity. A reactive urethane liquid mixture is injected into the mold cavity, and is permitted to bleed or leak between the outboard flange edge of the wheel backbone and the forming surface of the lower mold to evacuate air and/or gas from the mold cavity. After the urethane is fully cured, the wheel backbone with overlay adhered thereto is removed from the mold, and the offal formed at the outboard flange edge of the wheel backbone is trimmed in a multi-step knife cutting process, and subsequent buffing operations to form the outer periphery of the plastic overlay.

The trimming of the urethane offal from the outboard flange edge of the wheel backbone requires cutting through the outer skinned surface of the plastic overlay. Consequently, the rough cellular portion of the underlying urethane material is exposed, which can permit moisture to come in to contact with the metal wheel, and result in oxidation. Furthermore, the cut outer peripheral edge of the plastic overlay is rather rough, and is difficult to finish by means such as painting, coating, or the like. Even with buffing operations, the cut outer edge of the plastic overlay remains rough, and contains multiple cavities or depressions, which detract from the visual appearance of the wheel.

SUMMARY OF THE INVENTION

One aspect of the present invention is to provide a method for making composite styled wheels of the type having a rigid wheel backbone with a plastic overlay on an outboard face thereof. The wheel backbone is positioned in a lower mold to define a mold cavity therebetween, and an upper mold seals through apertures in the wheel backbone. The lower mold has a ring-shaped forming surface that selectively abuts the outboard flange edge of the wheel backbone, and a riser which selectively engages the wheel backbone, and selectively positions the outboard flange edge a spaced apart distance from the forming surface to define a venting space therebetween. A reactive urethane mixture is injected into the mold cavity to fill at least a portion of the same, and flow the mixture through the venting space to evacuate air and gas from the mold cavity. Before the mixture has fully cured, the riser is actuated, and the wheel backbone and lower mold are converged, so that the outboard flange edge abuts the forming surface to seal off the venting space, and form over at least a portion of the outboard flange edge, a smooth, skinned, mold-formed outer portion of the plastic overlay, which requires little or no subsequent trimming.

Yet another aspect of the present invention is a mold for making composite styled wheels of the type having a rigid wheel backbone with a plastic overlay adhered to at least a portion of the outboard face of the wheel backbone to provide a decorative appearance to the associated composite wheel. The mold comprises a lower mold adapted to receive therein the wheel backbone, and define a mold cavity therebetween. The lower mold has a ring-shaped forming surface configured to selectively abut an outboard flange of the wheel backbone, and a riser which selectively engages the wheel backbone, and selectively positions the outboard flange edge a predetermined spaced apart distance from the forming surface to define a venting space therebetween. An upper mold mates with the lower mold, and is configured to engage an inboard face of the wheel backbone, and in combination with the lower mold, seal off through apertures in the wheel backbone. A lock selectively interconnects the upper and lower molds together about the wheel backbone in a closed position, and prevents inadvertent separation of the same during injection of the mold cavity. A sprue passageway selectively communicates with the mold cavity to facilitate injecting a reactive urethane liquid mixture into the mold cavity to fill at least a portion of the same, and flow the mixture through the venting space to evacuate air and gas from the mold cavity. Before the mixture has fully cured, the riser is actuated, and the upper and lower molds are converged, so that the outboard flange edge of the wheel backbone abuts the forming surface of the lower mold to seal off the venting space, and form over at least a portion of the outboard flange edge a smooth, skinned, mold-formed outer portion of the plastic overlay.

Yet another aspect of the present invention is a composite styled wheel of the type comprising a metal wheel backbone including a disc and a rim interconnected to form an assembly operable as a metal street wheel when a pneumatic tire is mounted on the rim. The assembly includes an outboard flange with a terminal, outer edge and an ornamental overlay disposed adjacent and covering at least a portion of the outboard face of the metal wheel backbone. The overlay has a body of resilient plastic urethane material permanently affixed to the wheel metal backbone. The outboard face of the overlay is exposed to view from the outboard side of the wheel, and has a contour differing from the contour of the covered portion of the metal wheel backbone, and provides a decorative contour over at least the wheel disc. The disc has a central aperture and wheel mounting fastener holes therein, and the overlay has associated apertures including an internal surface registering coaxially with the disc central aperture and holes to define a central cavity in the body adapted to receive a wheel hub and mounting part therein. The outer edge of the outboard flange on the metal wheel backbone has a contour which diverges from a radially outward portion thereof in an axially inward direction to a radially inward portion thereof, such that the outer edge is oriented generally at an acute angle with respect to the axial centerline of the wheel. The overlay has a smooth, skinned, mold-formed exterior surface at the outboard face, and a radially outwardmost portion overlaying at least a portion of the outboard flange edge, which portion is formed integrally with the overlay, and has a smooth, skinned, mold-formed exterior surface that is continuous with and blends into the exterior surface at the outboard face of the overlay, thereby avoiding trim cuts and rough edges on the smooth, skinned exterior surface of the overlay.

The principal objects of the present invention are to provide an improved composite styled wheel, and related method and apparatus for making the same, wherein the plastic material which overlays the outboard face of the wheel backbone is formed over at least a portion of the edge of the outboard flange to create a smooth, skinned, mold-formed outer surface that is integral with and blends into the central surface of the plastic overlay. The resultant composite wheel has improved moisture resistance around the outboard flange edge to reduce corrosion, and a clean, smooth mold-formed peripheral edge which blends into the balance of the plastic overlay. The trimming, buffing, and other finish steps associated with prior composite wheels are eliminated, resulting in a significant reduction in manufacturing costs. Preferably, the mold-formed outer surface extends over a major portion of the outboard flange edge of the wheel backbone, and requires little or no trimming, so as to avoid exposing the underlying cellular portion of the plastic overlay. A movable riser forms a positive venting space at the periphery of the mold through which the mixture flows during injection of the mold cavity to evacuate air and gas therefrom, and alleviate the formation of bubbles, or other similar irregularities in the plastic overlay. The movement of the riser is carefully controlled to be certain that all air and/or gas is evacuated from the mold cavity, while minimizing the amount of mixture overflow to reduce material costs. The venting space is accurately set to reduce cycle time, and ensure that the mold cavity is completely and uniformly filled, so as to avoid defects in the decorative exterior surface of the wheel. The wheel and associated method and mold are efficient in use, economical to manufacture, capable of a long operating life, and particularly well adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
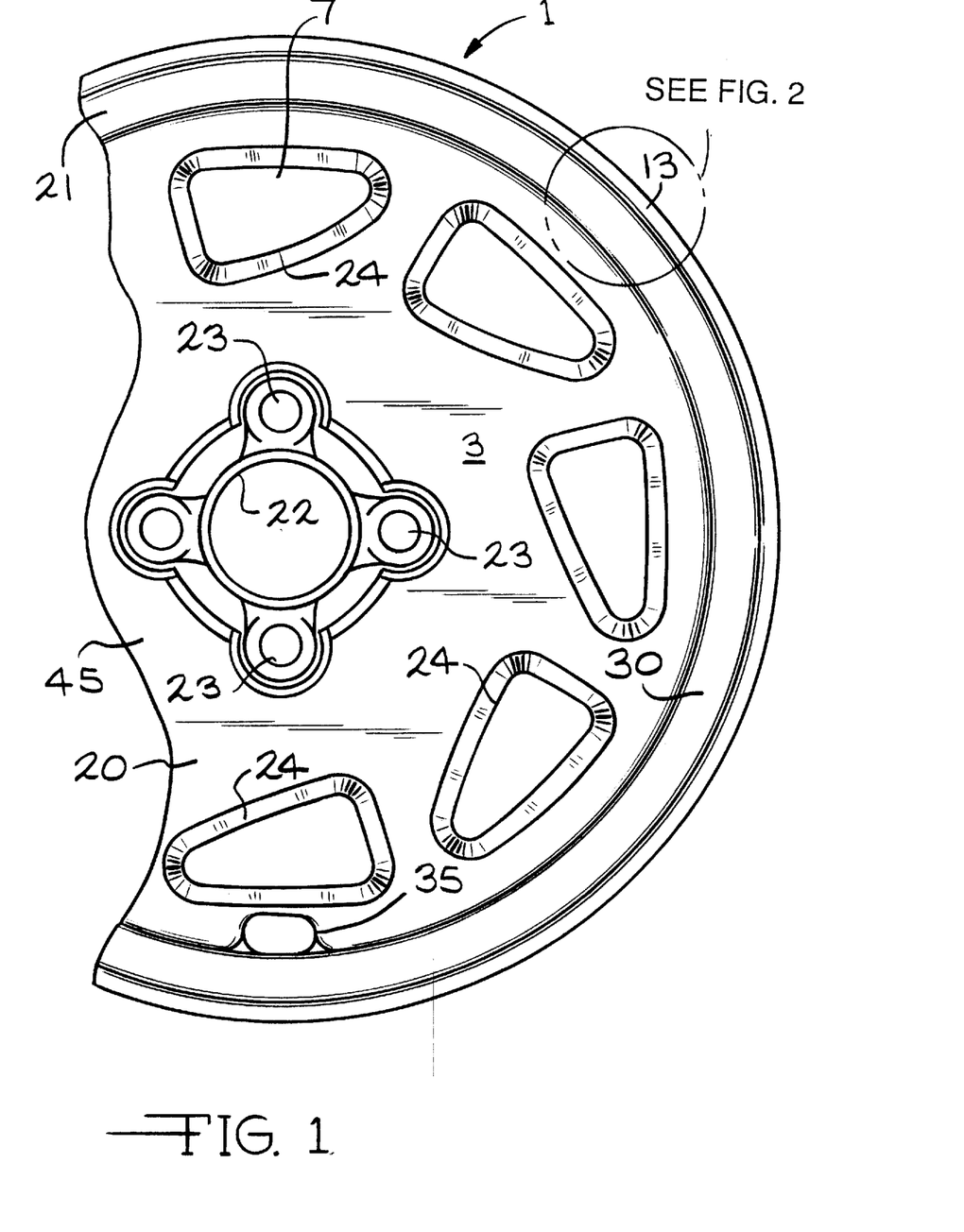
FIG. 1 is a fragmentary, front elevational view of a composite styled wheel embodying the present invention.

For purposes of description herein, the terms "upper", "lower", "right", "left", "rear", "front", "vertical", "horizontal", "radial", "axial", and derivatives thereof shall relate to the invention as oriented in FIG. 1. However, it is to be understood that the invention may assume various alternative orientations, and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
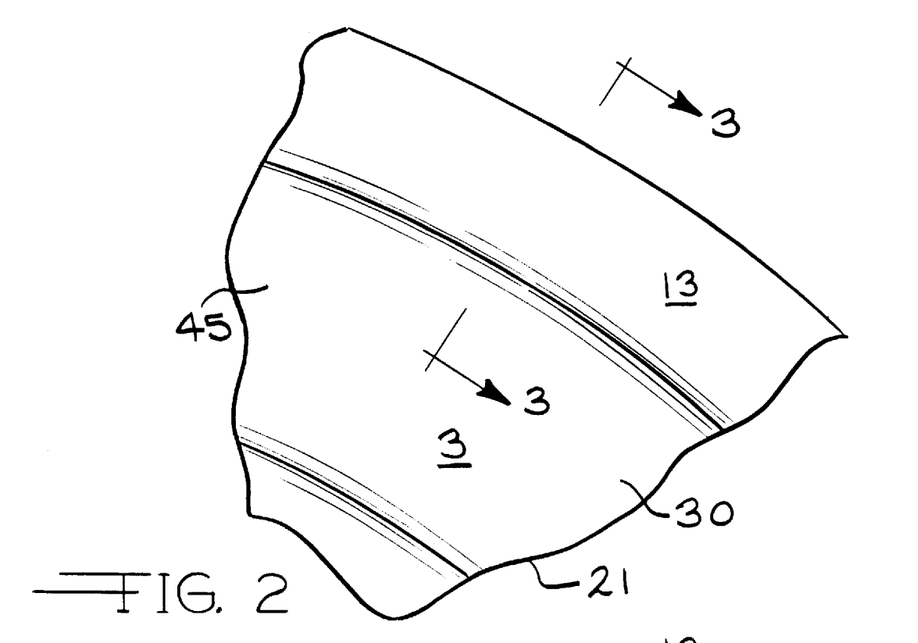
FIG. 2 is an enlarged, fragmentary view of the composite wheel, showing an outboard flange edge portion thereof.
Figure 11:
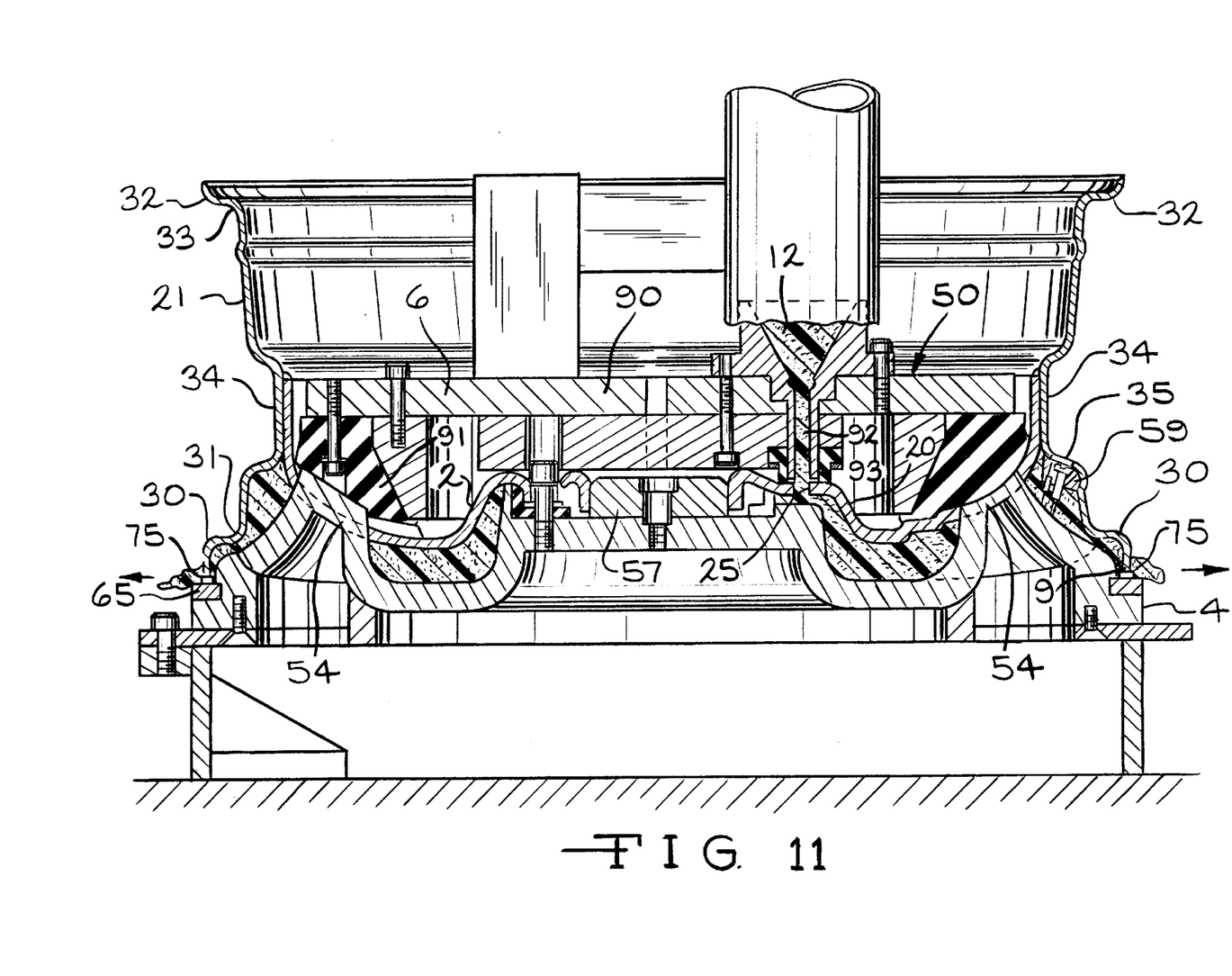
FIG. 11 is a partially schematic, vertical cross-sectional view of the lower mold, the wheel backbone, and the upper mold, shown in a closed position during injection of the mold cavity, with the riser in its fully extended position.
Figure 12:
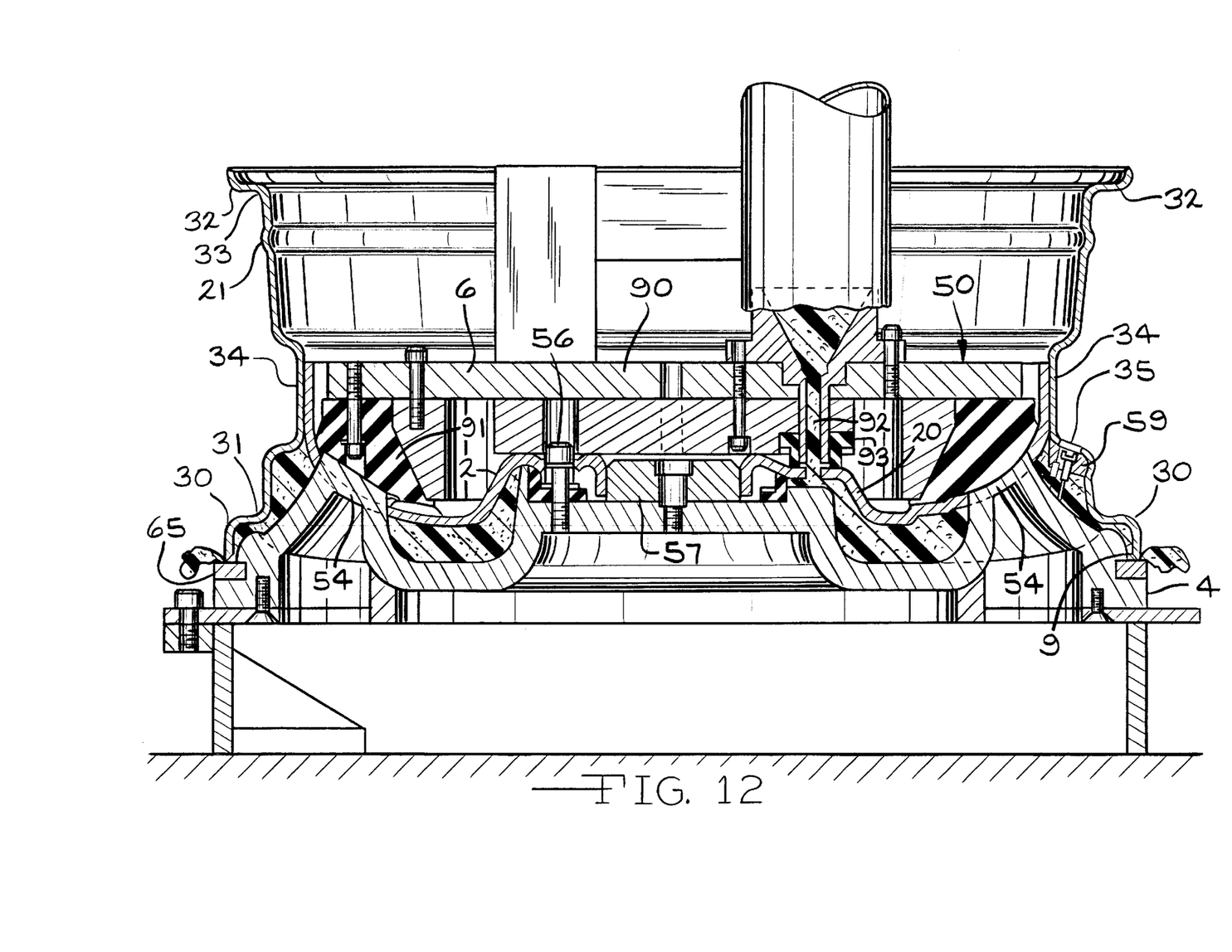
FIG. 12 is a partially schematic, vertical cross-sectional view of the lower mold, the wheel backbone, and the upper mold, shown in a closed position during injection of the mold cavity, wherein the riser has been retracted to converge the outboard flange edge of the wheel backbone into the forming surface of the lower mold.

The reference numeral 1 (FIGS. 1–3) generally designates a composite styled wheel embodying the present invention. The illustrated wheel 1 has a rigid wheel backbone 2 with a plastic overlay 3 on the outboard face thereof. Wheel backbone 2 is positioned in a lower mold 4 (FIG. 10) to define a mold cavity 5 therebetween, and an upper mold 6 seals through apertures 7 in wheel backbone 2. Lower mold 4 has a ring-shaped forming surface 8 that selectively abuts the outboard flange edge 9 of wheel backbone 2, and a riser 10 which selectively engages wheel backbone 2, and selectively positions the outboard flange edge 9 a spaced apart distance from forming surface 8 to define a venting space 11 (FIG. 8A) therebetween. A reactive urethane mixture 12 (FIG. 11) is injected into mold cavity 5 to fill at least a portion of the same, and flow the mixture 12 through venting space 11 to evacuate air and gas from mold cavity 5. Before the mixture 12 has fully cured, riser 10 is actuated, and wheel backbone 2 and lower mold 4 are converged, as shown in FIG. 12, so that the outboard flange edge 9 of wheel backbone 2 abuts the forming surface 8 of lower mold 4 to seal off venting space 11, and form over at least a portion of the outboard edge 9, a smooth, skinned, mold-formed outer portion 13 (FIGS. 1–3) of plastic overlay 3.

With reference to FIGS. 1–5, wheel backbone 2 is a rigid assembly, and can be constructed from fabricated steel, cast aluminum, or a wide variety of other materials and construction techniques. The illustrated wheel backbone 2 comprises a disc 20 and rim 21 interconnected in a conventional fashion to form a standard metal street wheel or "plain Jane" wheel, when a pneumatic tire is mounted on the same. In the illustrated example, the wheel disc 20 includes a central piloting aperture 22, surrounded by a plurality of fastener holes 23 through which fasteners (not shown) extend to mount the wheel 1 on a wheel hub, brake drum, spindle, or other associated vehicle member (not shown). Windows or vents 24 are positioned through disc 20 in a circumferentially spaced apart pattern disposed radially outwardly of fastener holes 23, and serve to provide an aesthetically pleasing appearance to the wheel, as well as cooling for the vehicle brakes. The wheel backbone 2 shown in FIG. 4 also has a special filler aperture 25 to facilitate injecting mold cavity 5 from in inboard face of disc 20, as described more fully below.

The rim portion 21 of the illustrated wheel backbone 2 has a conventional drop center design, and includes an outboard flange 30 and associated bead seat 31, and an inboard flange 32 and associated bead seat 33. A channel 34 extends along the central portion of rim 21 and forms a drop center to facilitate installation of a pneumatic tire on wheel 1. A valve stem aperture 35 is provided in rim 21, and is adapted to receive a tire valve stem (not shown) therein to inflate the associated pneumatic tire (not shown). In the example illustrated in FIG. 3, the outboard flange 30 of wheel backbone 2 includes a terminal, outer edge 9, having a radially outermost side 39 and a radially innermost side 40. The illustrated outer edge 9 of wheel backbone 2 has a contour which diverges from the radially outward side 39 in an axially inward direction to the radially inward side 40, such that outer edge 9 is oriented generally at an acute angle with respect to the axial centerline of wheel 1. In the illustrated example, edge 9 is substantially planar and is oriented at an angle in the range of 5 to 20 degrees from the exterior surface of the outer portion 13 of overlay 3.

The overlay 3 (FIGS. 1–3) portion of composite wheel 1 is adhered to the outboard face of wheel backbone 2, and may assume a wide variety of different shapes and configurations, depending upon the aesthetics desired by the customer and/or wheel designer. In general, overlay 3 has a smooth, skinned exterior surface 45 which extends generally from the fastener holes 23 in wheel backbone 22 radially outwardly to over at least a portion of the outboard flange edge 9, so as to create a very sleek, finished appearance. Directly underneath the skinned exterior surface 45 of overlay 3 is a cellular interior construction, which is well-known in urethanes, and other similar materials. The cellular material provides a relatively lightweight construction, and is somewhat flexible to accommodate wheel strain. Overlay 3 is formed about the various openings in wheel backbone 2, such as pilot hole 22, fastener holes 23, vents 24 and valve stem aperture 35 in the manner described hereinbelow.

Figure 4:
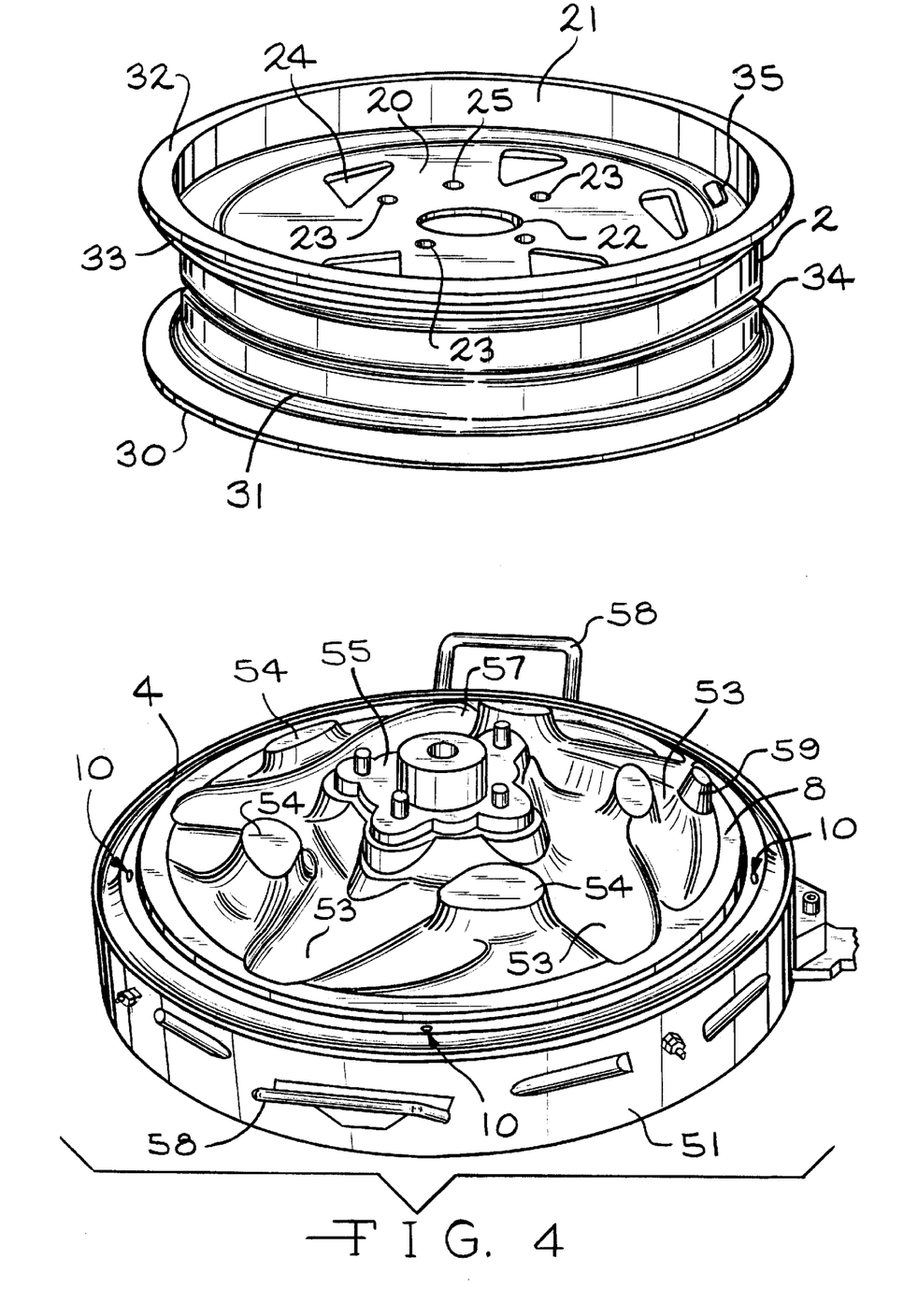
FIG. 4 is an exploded, perspective view of a lower mold and a wheel backbone, which are used in constructing the composite wheel.
Figure 5:
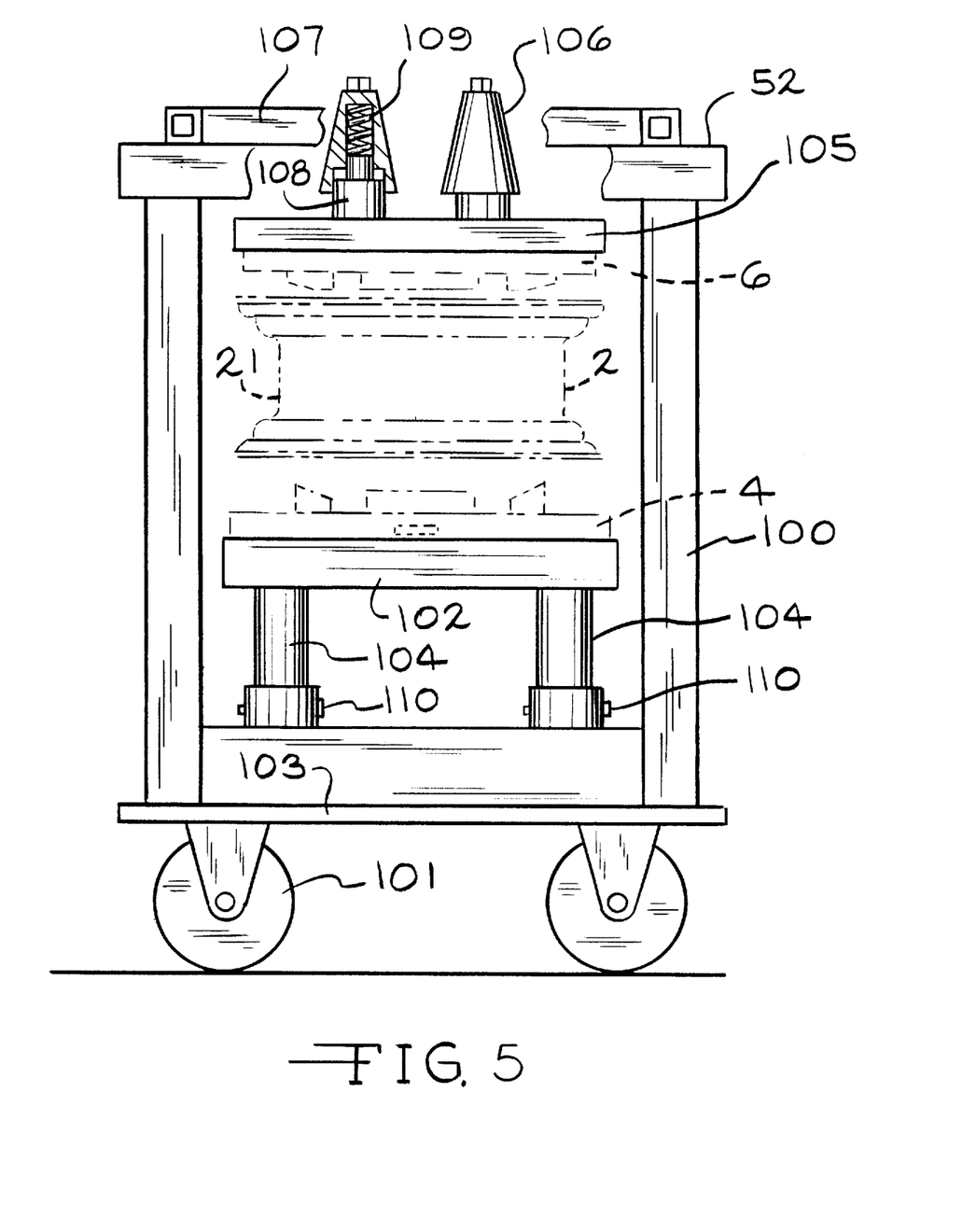
FIG. 5 is a fragmentary, partially schematic, side elevational view of a fixture for retaining the mold and wheel backbone during processing.
Figure 9:
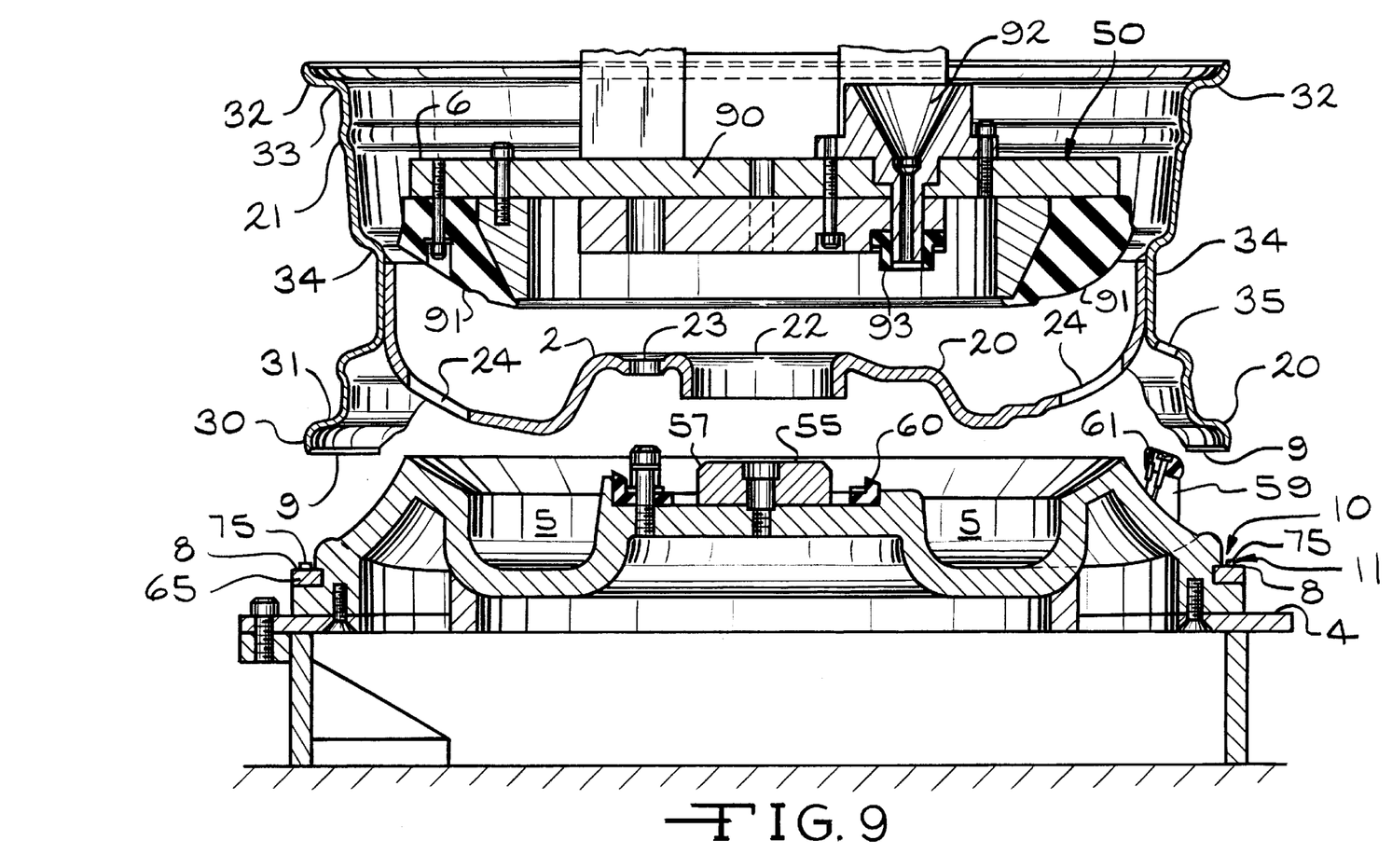
FIG. 9 is a partially schematic, vertical cross-sectional view of the lower mold, the wheel backbone, and an upper mold, shown in an exploded condition.

The lower mold 4 and upper mold 6 collectively define a split mold 50 in which wheel backbone 2 is received for molding overlay 3 on the outboard face thereof to provide a decorative appearance to composite wheel 1. With reference to FIG. 4, the illustrated lower mold 4 includes a cylindrically shaped hollow base 51, which is adapted to be mounted in a lower part of a fixture 52 (FIG. 5). The deck portion of lower mold 4 (FIG. 4) is contoured to form the exterior surface 45 of overlay 3, and in the illustrated example, includes a star-shaped pattern of recesses 53 which blend into upstanding plugs 54 adjacent the intersections of the legs of the star. As described in greater detail hereinafter, plugs 54 are shaped to be closely received within the vent windows 24 of wheel backbone 2 to seal the same during the molding process. The lower mold 4 also has a centrally located upstanding X-shaped center plug 55 to seal the pilot and fastener apertures 22 and 23 of wheel backbone 2. More specifically, upstanding rod-shaped elements 56 are received in the fastener holes 23 of wheel backbone 2, and a cylindrically shaped center element 57 is received in the pilot opening 22 of wheel backbone 2. Handles 58 are positioned adjacent opposite sides of the mold base 51, and facilitate manually mounting and demounting the lower mold 4 in fixture 52. A valve stem plug 59 also protrudes upwardly from the upper portion of lower mold 4 and is adapted to be received in the valve stem aperture 35 of wheel backbone 2 to seal the same during molding. As best illustrated in FIG. 9, a seal 60 extends around center plug 55, and serves to engage the interior portion of disc 20 to seal the same in mold 50. Another seal 61 is positioned about the upper portion of valve plug 59 to seal in the associated aperture 25 of wheel backbone 2.

Figure 6:
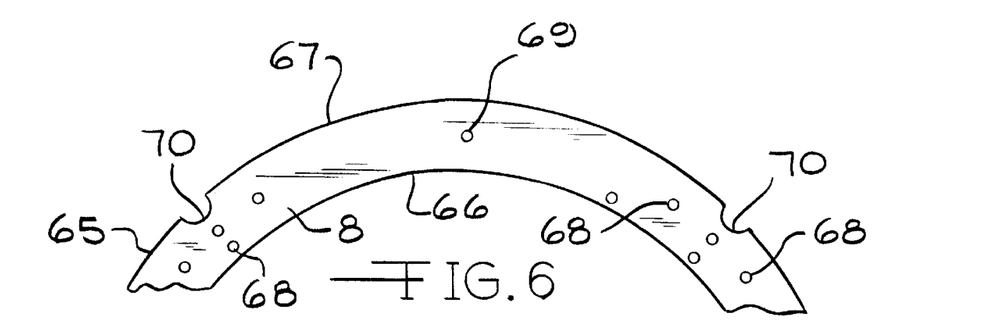
FIG. 6 is a fragmentary, top plan view of a ring-shaped, forming surface portion of the lower mold.
Figure 7:
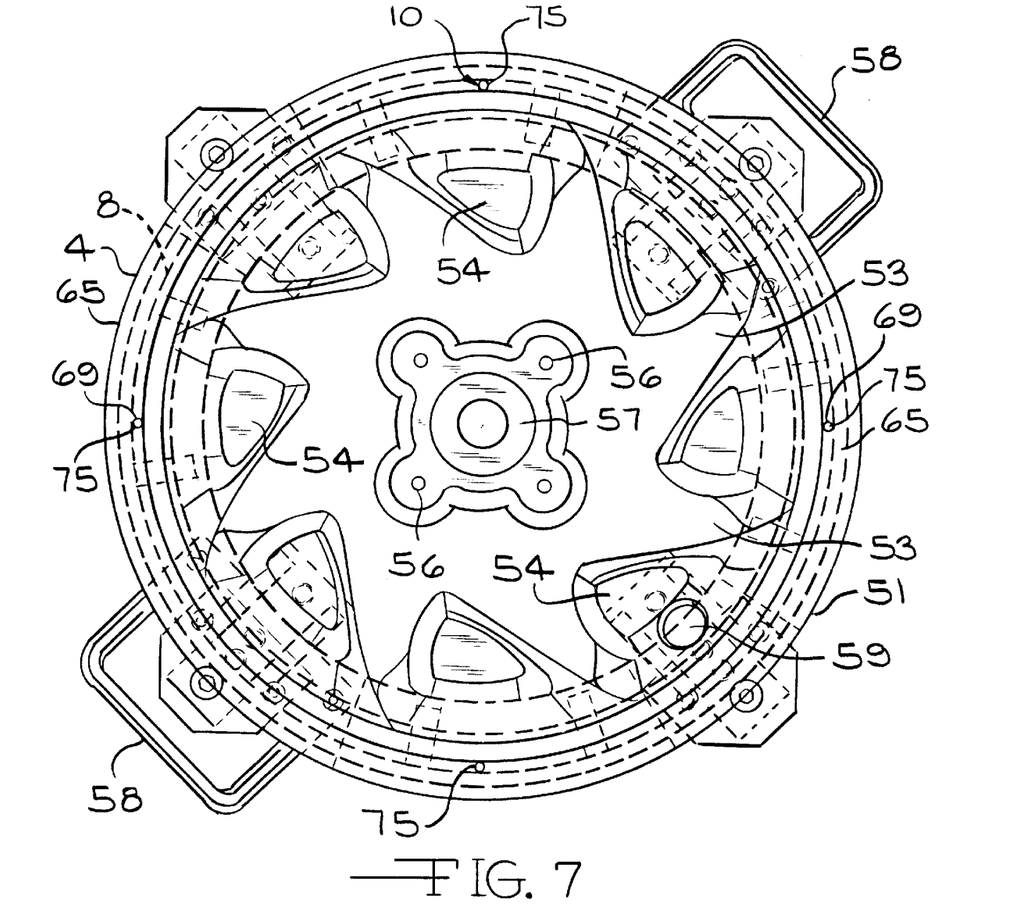
FIG. 7 is a top plan view of the lower mold.
Figures 8, 8A:
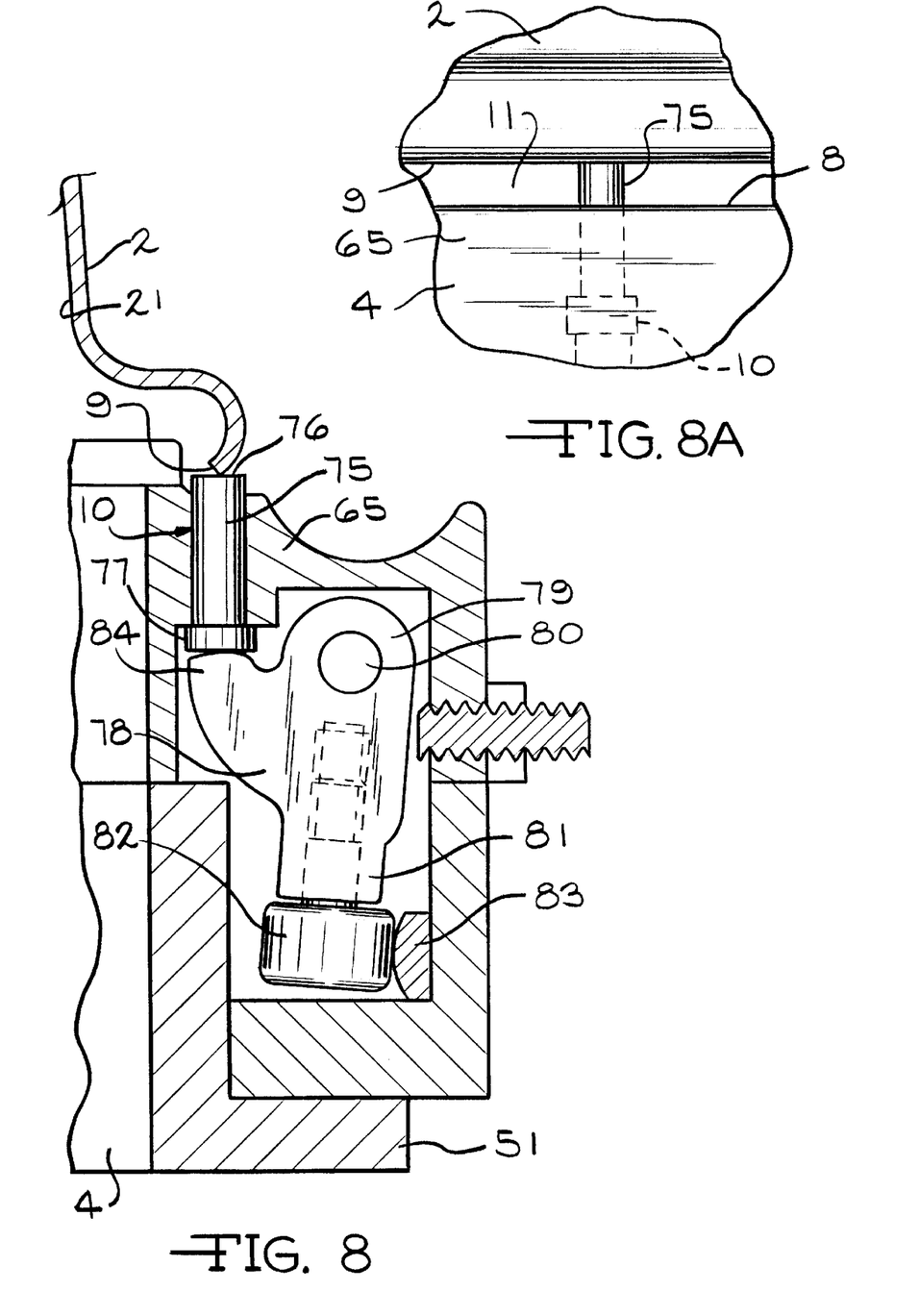
FIG. 8 is an enlarged, fragmentary, vertical cross-sectional view of an outer peripheral portion of the lower mold, showing a riser.
FIG. 8A is a fragmentary side elevational view of the lower mold, showing the riser in its fully extended position, and a venting space formed thereby.

As best illustrated in FIGS. 6–8, the illustrated lower mold 4 also includes forming surface 8, which in the illustrated example, comprises the upper surface of an annular pin retainer ring 65. Ring 65 has its inside edge 66 seated in a recess or ledge near the outer periphery of lower mold 4, and its outer edge 67 is positioned radially outside of the outboard flange edge 9 of wheel backbone 2. Ring 65 is preferably removably attached to the mold base 51, such that differently shaped rings 65 can be used to mold a variety of different wheels 1, as described in greater detail hereinafter. In the illustrated example, ring 65 is provided with a plurality of fastener apertures 68 through which fasteners are inserted to attach ring 65 to mold base 51. The illustrated ring 65 also includes four riser apertures 69 which extend therethrough adjacent edge notches 70, and are circumferentially positioned about ring 65 ninety degrees apart.

Figure 3:
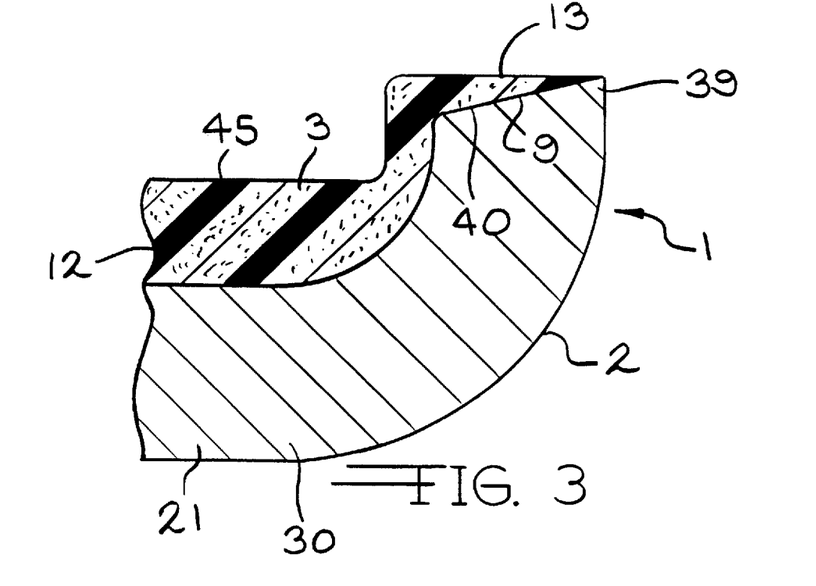
FIG. 3 is an enlarged, cross-sectional view of the composite wheel taken along the line III—III, FIG. 2.

Preferably, mold 50 has multiple pin retainer rings 65 which can be used with the same, so that different sizes and types of wheels 1 can be produced using the same equipment. The specific shape of the outboard flange edge 9 of wheel backbone 2 is an important factor in selecting the appropriate pin retainer ring 65. More specifically, the shape of the forming surface 8 on ring 65 should be complementary with the outboard flange edge 9, such that the same abut in substantially line contact along an axially outward portion of the outboard flange edge, such that the plastic overlay 3 covers at least a portion of edge 9. Where possible, forming surface 8 is shaped to abut the radially outermost side 39 of outboard flange edge 9, and diverge therefrom in a radially inward direction. That portion 13 of overlay 3 extending over edge 9 will assume a variable thickness, which is wedge-shaped in cross section, as shown in FIG. 3. If edge 9 is rounded, or otherwise shaped differently, overlay 3 will extend over only the interior portion of edge 9 to the point edge 9 is tangent with forming surface 8. Hence, it is to be understood the forming surface 8 can be configured to be complementary with the shape of edge 9 to obtain a smooth, mold-formed plastic surface that extends over at least a portion of the outboard flange edge 9.

Figure 13:
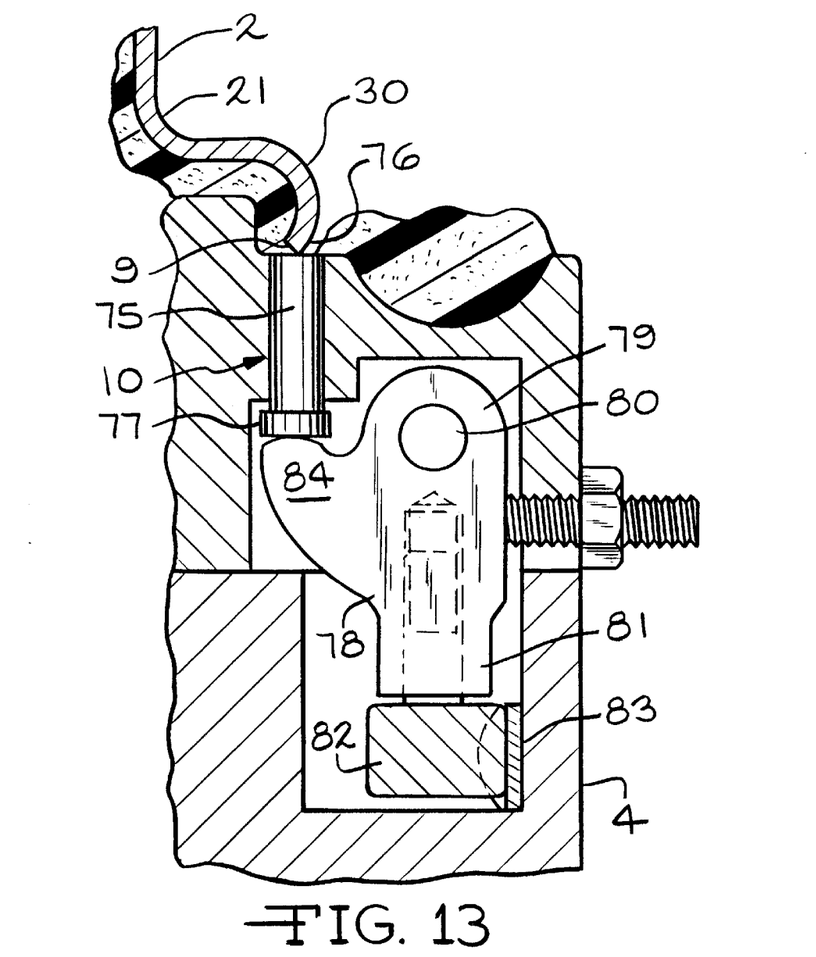
FIG. 13 is an enlarged, fragmentary, vertical cross-sectional view of the wheel backbone and the lower mold, wherein the riser is shown in its fully retracted position after injection of the mold cavity.

In the example illustrated in FIGS. 1–13, riser 10 is retractable, and comprises four riser pins 75 (FIG. 8), which are slidably mounted in the lower mold 4, and extend through the riser apertures 69 of ring 65. The upper ends 76 of pins 75 are substantially planar, and disposed perpendicular with the central axis of pin 75. The lower ends 77 of riser pins 75 are enlarged to form heads which engage lifting levers 78 mounted within mold base 51. As best shown in FIG. 8, each riser pin 75 has a lifting lever 78 associated therewith, wherein lifting lever 78 has an upper portion 79 pivotally mounted within mold base 51 by a pin 80 and a lower portion 81 having a follower or roller 82 that engages an annularly shaped cam or actuator ring 83, which rotates in a normally horizontal plane, or coaxially with the axial centerline of mold 50. Lifting lever 78 also includes an outwardly projecting arm 84, which engages the lower end 77 of riser pin 75. When actuator ring 83 is rotated, each of the lifting levers simultaneously pivots about its associated pin 80, so as to contemporaneously shift each of the riser pins 75 between their fully extended position, as shown in FIG. 8, and their fully retracted position, as shown in FIG. 13. As will be described in greater detail hereinafter, the positioning and movement of riser pins 75 is carefully controlled to accurately form the overlay 3 for a wide variety of different types of backbones 2 and wheels 1.

With reference to FIG. 9, the illustrated upper mold 6 comprises a central, disc-shaped plate 90 having a diameter slightly less than the inside diameter of wheel disc 20. Plate 90 includes an exterior seal 91, which abuts the upper ends of the plugs 54 in lower mold 4 to seal the vents or windows 24 of composite wheel 1. Upper mold 6 also includes a sprue passageway 92 with a seal arrangement 93 at the lower end thereof, which mates with one of the filler apertures 25 in wheel backbone 22. In this manner, the urethane mixture 12 is injected into the mold cavity 5 through filler hole 25 on the inboard face of wheel backbone 2, so as to avoid forming a sprue on the exterior surface 75 of the overlay 3.

The fixture 52, which is shown schematically in FIG. 5, is provided to mount mold 50 and wheel backbone 2, and translate the same through a processing line, such as that disclosed in previously noted Motor Wheel U.S. Pat. Nos. 5,059,106; 5,088,798 and 3,762,677. The illustrated fixture 52 has a rigid frame 100 mounted on casters 101, so as to permit each fixture 52 to be individually shifted into and out of the processing line. Fixture 52 includes a lower platen 102 to which lower mold 4 is removably mounted. Lower platen 102 is movably supported on the base 103 of frame 100 by a plurality of linear motors, such as hydraulic jacks 104, or other similar devices, which may be actuated to raise and lower platen 102 with respect to frame 100. Positive stops, such as through pins, or the illustrated wedges 110 are provided adjacent the linear motors 104 to positively lock mold 50 closed for mixture injection, and subsequent processing steps. Fixture 52 also includes an upper platen 105 in which the upper mold 6 is removably mounted. The upper platen 105 is suspended from a plurality of frustroconically shaped housings 106, which are fixedly mounted on frame cross bars 107. A plurality of pins 108 have their lower ends fixedly attached to upper platen 105, and their upper ends extending through housings 106. Springs 109, or similar resilient biasing devices, such as resilient tubes, Belville washers, etc. are mounted over the upper ends of pins 108, so as to mount upper platen 105 in a resiliently biased manner. In one example of the present invention, springs 109 are coiled type die springs. As described in greater detail hereinafter, when mold 50 is closed, the converging pressure between upper mold 6 and lower mold 4 will compress springs 109 to pre-tension the same together with a resilient biasing force.

Figure 10:
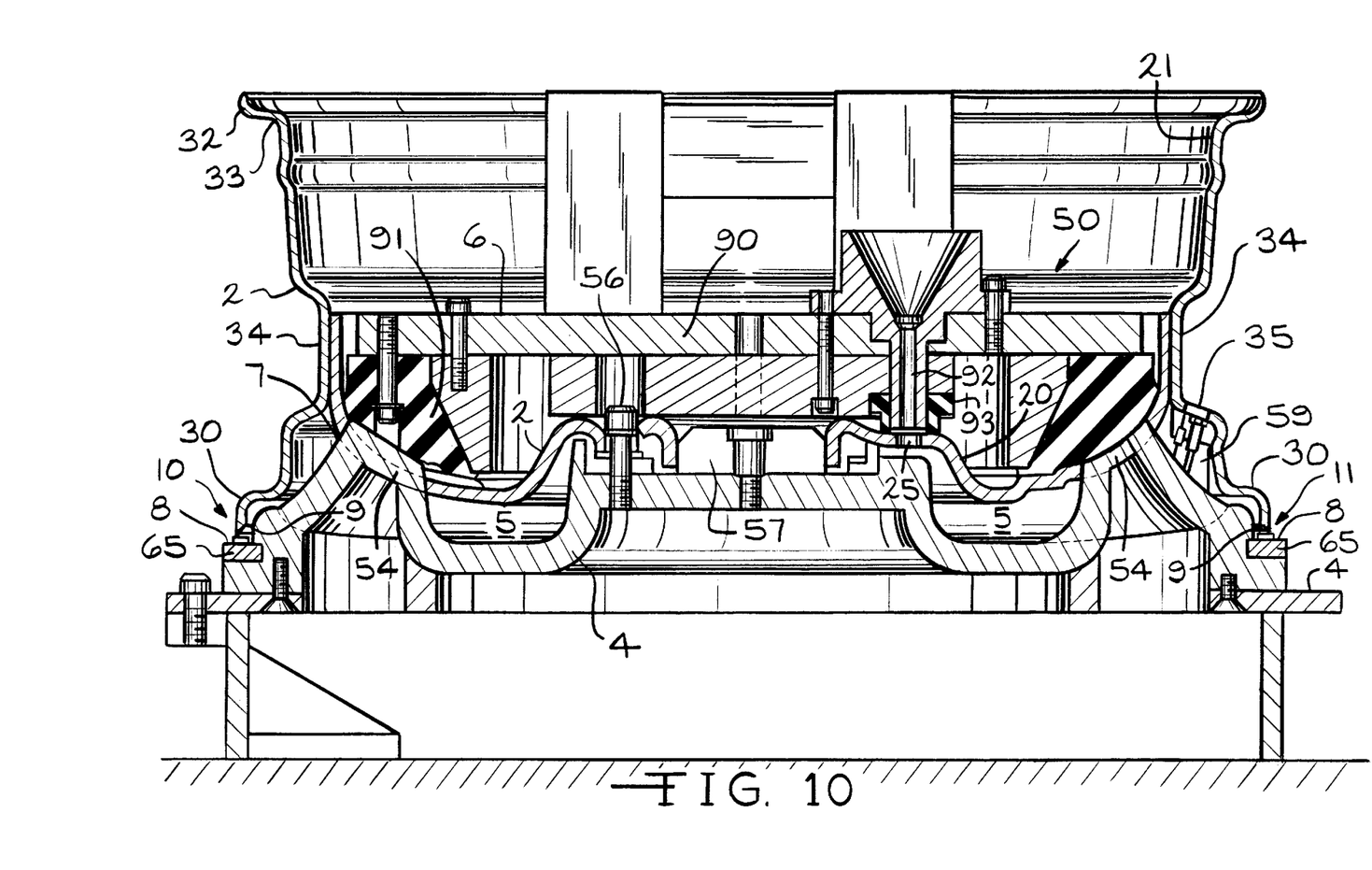
FIG. 10 is a partially schematic, vertical cross-sectional view of the lower mold, the wheel backbone, and the upper mold, shown in a closed position, prior to injection.

In operation, a composite styled wheel 1 is constructed in the following manner. A mold 50, with matching lower half 4 and upper half 6, is first selected in accordance with the type of wheel backbone 2 to be used, as well as the specific urethane mixture 12 and overlay design desired. The lower mold 4 is mounted in the lower platen 102 of fixture 52, and the upper mold 6 is mounted in the upper platen 105 of fixture 52, as shown in FIG. 5. Any adjustment necessary to ensure correct alignment between lower mold 4 and upper mold 6 is then made. With lower platen 102 in its fully retracted position, a wheel backbone 2, is selected from the group chosen for use with mold 50. Other conventional preparation steps, such as applying a mold release, adhesive or other coatings to the mold 50 and wheel backbone 2 may be performed at this point. The selected wheel backbone 2 is then positioned in lower mold 4, with the outboard face of wheel backbone 2 facing the forming surface of lower mold 4, as shown in FIG. 9. The selected wheel backbone 2 is positioned such that the plugs 54, 56, 57 and 59 on the lower mold are received through the mating apertures 24, 22, 23 and 35 in the wheel backbone 2. The actuation ring 83 of riser 10 is manipulated such that each of the riser pins 75 is positioned in its fully extended position, as shown in FIGS. 8 and 10. The outboard flange edge 9 of the wheel backbone 2 is positioned centrally on each of the four riser pins 75, so as to positively locate the axially outermost portion of outboard flange edge 9 a predetermined distance from the forming surface 8 of lower mold 4. In one working example of the present invention, the height of the venting space 11 is in the range of 0.010 to 0.030 inches, and is preferably around 0.020 inches The venting space 11 provides a positive, highly accurate gap around the entire outboard flange edge 9 of wheel backbone 2. Hence, air and/or gas in mold cavity 5 or the curing urethane mixture 12 can easily escape from the mold cavity to avoid the formation of irregularities in the exterior surface of the plastic overlay 3. This positive gap also makes filling mold 50 quickly and fully more easy, as there is reduced back pressure in mold cavity 5. Also, the injected urethane mixture 12 tends to mix more uniformly as it fills the mold cavity 5 as a consequence of venting space 11.

With the selected wheel backbone 2 positioned accurately on lower mold 4, the lower platen 102 of fixture 52 is raised, so as to raise lower mold 4 and the associated wheel backbone 2 into abutting contact with upper mold 6, thereby sealing off the through apertures 22–24 and 35 in wheel backbone 2, and closing the mold cavity 5. Additional upward translation of lower platen 102 pre-loads the springs 109, so as to resiliently bias upper mold 6 and lower mold 4 together, and securely retain the selected wheel backbone 2 therebetween. The venting space 11 remains fully open, as riser pins 75 are in their fully extended position. In one working example of the present invention, a pre-load pressure of approximately 500–1500 pounds is applied. The pre-loaded mold is then positively locked closed by inserting wedges 110, or performing other similar locking steps.

The loaded fixture 52 (FIG. 10) is then placed into the processing line, where it is prepared for injection, such as by heating, and other currently known processing steps. When the loaded fixture 52 is ready for injection of the urethane mixture 12, it is positioned in the injection station, and urethane mixture 12 is injected into the mold cavity 5 through sprue passageway 92. As best illustrated in FIG. 11, the injection of urethane mixture 12 at least partially fills the mold cavity 5, and flows the mixture 12 through the venting space 11 to evacuate air and gas from mold cavity 5. As soon as a predetermined amount of mixture 12 has been injected into the mold cavity 5, the riser actuator ring 83 is manipulated, so as to retract each of the riser pins 75 in a substantially contemporaneous fashion into lower mold 4, as shown in FIG. 12. The pre-loaded resilient biasing force of springs 109 securely retains the lower and upper molds 4 and 6 in their fully closed position about the selected wheel backbone 2. As best shown in FIGS. 12 and 13, when the riser pins 75 are fully retracted, the outboard flange edge 9 of the selected wheel backbone 2 abuts the forming surface 8 of the lower mold 4 to seal off venting space 11, and form over at least a portion of the outboard flange edge 9 the smooth, skinned, molded outer portion 13 of plastic overlay 3. The force generated by springs 109 is sufficient to push wheel backbone 2 into the partially cured urethane mixture in mold cavity 5, until the outboard flange edge 9 of wheel backbone 2 securely abuts the forming surface 8 of lower mold 4. When the venting space 11 is thus closed, mold 50 is fully closed and sealed, such that additional mixture 12 will not bleed from the mold. In one working example of the present invention, urethane mixture 12 at a temperature of around 90°–160° F. (as measured at the mold cavity surface) is injected into the mold cavity 5 at a pressure of 1500–2500 psi for a period of approximately 1–10 seconds, at which time, riser pins 75 are retracted. The convergence of wheel backbone 2 into the partially cured urethane mixture 12 after riser 10 is actuated also tends to further compress the exterior surface 45 of the plastic overlay 3 to ensure a smooth, defect free condition.

The urethane mixture 12 is then fully cured in the mold cavity 5, so that it securely adheres itself to the outboard face of the selected wheel backbone 2. After the mixture 12 is fully cured, and all other process steps are completed, mold 50 is unloaded. The lower platen 102 is retracted and mold 50 is opened, so that the completed composite wheel 1 can be removed from mold 50. The sprue (not shown) formed on the inboard face of wheel backbone 2 is severed. The exterior surface 45 of plastic overlay 3 is skinned, and smooth all the way across disc 20 to the outer side 39 of the outboard flange edge 9. Consequently, whatever plastic offal which might remain adhered to the wheel backbone 2 about the outer periphery of the outboard flange 9, will simply fall off, or can be easily removed without disturbing the smooth, skinned exterior surface 45 of plastic overlay 3. It is not necessary to subject the completed composite wheel 1 to any additional trimming steps, such as by knives or the like, which can cut through the skinned surface and expose the interior cellular construction of the urethane.

The molded composite wheel 1 can then be further finished, such as by painting the exterior surface 45, or otherwise coating the same with materials to achieve the desired wheel appearance.

FIGS. 14–17 disclose various elements associated with an alternate embodiment of the present invention. Since this embodiment is similar to the previously described embodiment, similar parts appearing in FIGS. 1–13 and 14–17 respectively are represented by the same, corresponding reference numeral, except for the suffix "a" in the numerals of the latter.

Figure 14:
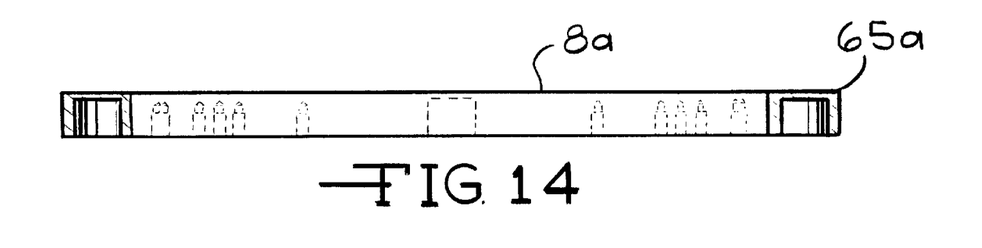
FIG. 14 is a vertical cross-sectional view of a lower mold portion of another embodiment of the present invention.

FIG. 14 discloses an alternate annular ring 65a, which includes four pockets 120 positioned underlying the riser apertures 69a. In this embodiment of the present invention, the risers 10a are collapsible, and include four riser cartridges 121 mounted in ring pockets 120. Each of the riser cartridges 121 has a resiliently biased pin 122, with an upper end that extends through the riser aperture 69a in mold forming surface 8a, and is vertically aligned with the outboard flange edge 9a of an associated wheel backbone 2a to abuttingly support the same prior to converging the lower mold 4a and upper mold. Each of the pins 122 has an enlarged sleeve portion 123 slidably mounted in an associated bore 124 of the cartridge jacket 125. A resiliently biased energy storage device 126 is mounted on the interior side of pin 122, and resiliently biases the same in an outwardly protruding direction. In the illustrated example, each energy storage device comprises a stack of Belville washers, which are positioned between a pair of backer washers 128. A lower plug 129 mounts the lower end of pin 122, and retains backer washers 128 in place, so as to bias pin 122 outwardly. In the illustrated example, riser cartridges 121 are provided in sets of four, where within each set, the riser cartridges are substantially identical. The resilient biasing force associated with each set of riser cartridges 121 is preferably varied, so as to accommodate the manufacture of different types of composite wheels 1, as described below.

In the embodiment of the present invention illustrated in FIGS. 14–17, ring 65a is first loaded with a set of four riser cartridges 121, which have been selected in accordance with the type of wheel backbone 2a, urethane mixture 12 and overlay shape 3a desired. The ring 65a with riser cartridges 121 therein is then mounted in lower mold 4a in the manner illustrated in FIG. 14.

Figures 15, 16, 17:
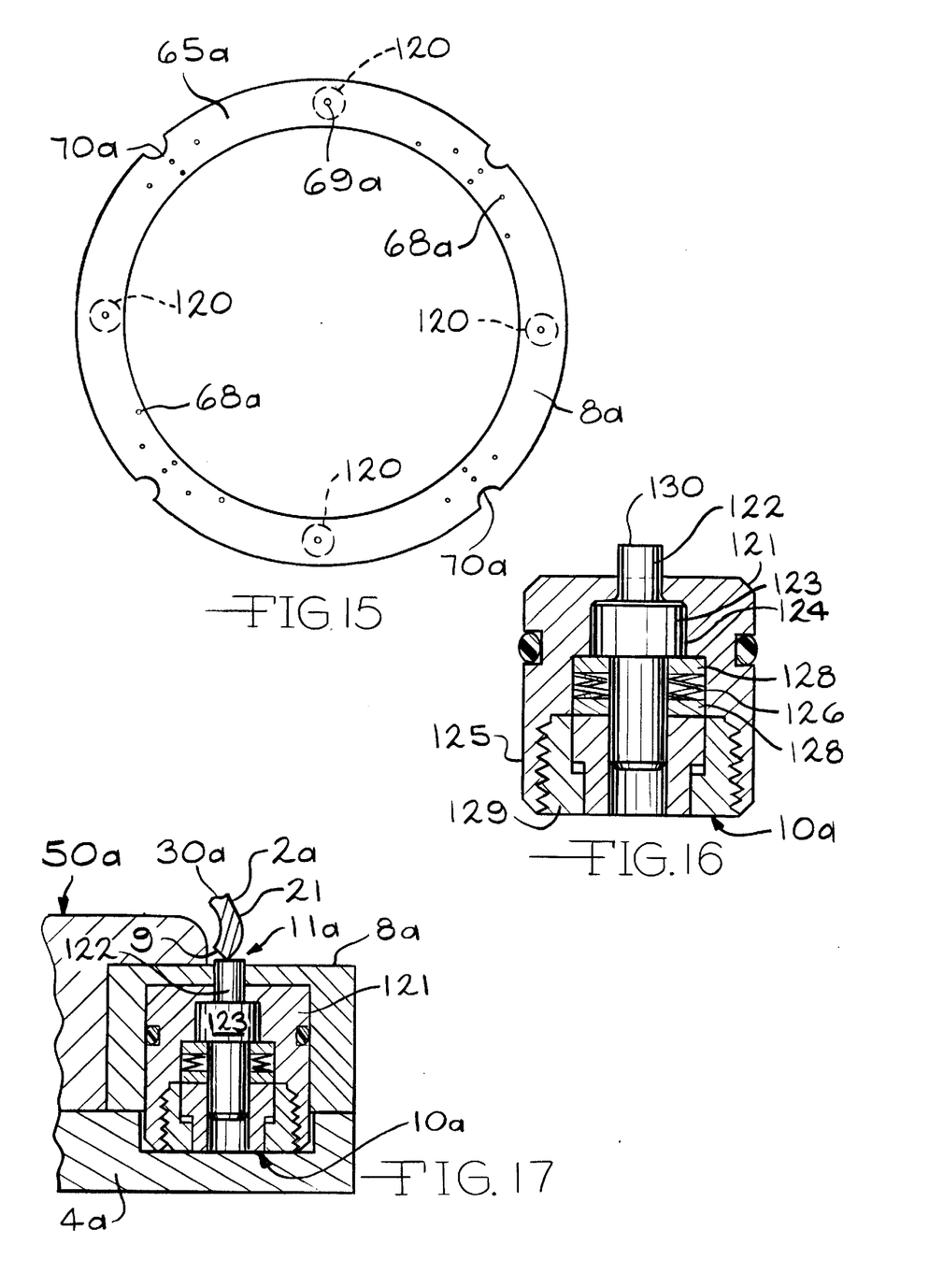
FIG. 15 is a top plan view of the lower mold portion shown in FIG. 14.
FIG. 16 is a vertical cross-sectional view of a riser cartridge used in the mold illustrated in FIGS. 14 and 15.
FIG. 17 is a partially schematic, vertical cross-sectional view of the lower mold portion shown in FIGS. 14 and 15, wherein the riser cartridge of FIG. 16 is shown installed in the lower mold.

Under normal circumstances, the resilient force of spring washers 126 will cause pins 122 to assume their normal, fully extended position, as shown in FIG. 17, wherein the upper end 130 of each pin 122 is positioned above the forming surface 8a of lower mold 4a a predetermined distance, such as around 0.020 inch.

In operation of this embodiment of the present invention, a wheel backbone 2a is loaded into the lower mold 4a in a manner similar to that previously described, such that the outboard flange edge 9a of the wheel backbone 2a is abuttingly supported on the protruding ends 130 of riser cartridges 121. When the mold 50a is closed over the selected wheel backbone 2a, the closing pressure applied to the mold is adjusted, so as to retain each of the riser cartridge pins 122 in its fully extended position, whereby the height of venting space 11a is not diminished. The associated mold 50a is then injected to fill at least a portion of the mold cavity and flow the mixture through venting space 11a to evacuate air and gas from the mold cavity in a fashion similar to that previously described. However, to fully close mold 50a, instead of retracting the riser pins 75, as described above, additional closure force is applied to mold 50a, such as by advancing the hydraulic jacks. It is this additional pressure which causes riser cartridges 121 to collapse, pushing the pins 122 downwardly into the riser cartridges 121 until the outboard flange edge 9a of the selected wheel backbone 2a engages the forming surface 8a of the lower mold 4a to seal off venting space 11a. This process also forms a smooth, skinned, mold-formed outer portion of the plastic overlay over at least a portion of the outboard flange edge. The timing and amount of the additional mold closure force are carefully balanced against the internal pressure which is generated within the mold cavity. Hence, in this process, venting space 11a does not necessarily close uniformly when the selected wheel backbone 2a is converged into the lower mold 4a, but rather the venting space 11a closes variably about the outboard flange edge 9a as a function of the resistance pressure in the mold cavity. Consequently, a more uniform molding on the outboard flange edge, as well as the interior of the mold cavity results, at least in some applications.

The use of riser cartridges 121 permits readily varying the closing characteristics of venting space 11a to accommodate different wheels, urethane mixtures, etc. Since the total closure force applied to close mold 50a, such as the hydraulic jacks, is relatively constant, the use of stiffer or weaker riser cartridges 121 will cause venting space 11a to close less quickly or more quickly, respectively. Hence, for any particular wheel application, the mold 50a can be easily set up to ensure complete evacuation of air and gases from the mold cavity, yet minimizing the overflow of urethane mixture. Consequently, a single mold 50a can be used to manufacture a variety of differently sized wheels, thereby greatly reducing capital expenses.

All embodiments of the present invention provide an improved composite styled wheel construction, as well as a related method and apparatus for making the same. The urethane plastic overlay portion of the composite wheel, which overlies the outboard face of the wheel backbone, extends over at least a portion of the outboard flange edge to create a smooth, skinned, mold-formed outer surface that is integral with and blends into the central surface of the plastic overlay. The resultant composite wheel has improved moisture resistance around the outboard flange edge to reduce corrosion and a clean, smooth mold-formed appearance which blends into the balance of the plastic overlay. The trimming, buffing and other finishing processes associated with prior composite wheels is eliminated, resulting in significant reductions in manufacturing costs. Preferably, the mold-formed outer surface extends over a major portion of the outboard flange edge of the wheel backbone, and requires little or no trimming, so as to avoid exposing the underlying cellular construction of the plastic overlay. The movable riser forms a positive venting space at the periphery of the mold through which the mixture is flowed during injection of the mold so as to evacuate air and gas therefrom, and alleviate the formation of bubbles, and/or other irregularities in the plastic overlay. The movement of the riser is carefully controlled to make certain that all air and/or gas is evacuated from the mold cavity, while minimizing the amount of mixture overflow to reduce material cost. The venting space is accurately set to reduce cycle time, and ensure the mold cavity is completely and uniformly filled to create an attractive exterior surface for the wheel.

In the foregoing description, it will be readily appreciated by those skilled in the art that modifications may be made to the invention without departing from the concepts disclosed herein. Such modifications are to be considered to be included in the following claims, unless these claims by their language expressly state otherwise.

The embodiment of the invention in which an exclusive property or privilege is claimed are defined as follows:

1. In a composite styled wheel of the type comprising a metal wheel backbone including a disc and a rim interconnected to form an assembly operable as a metal street wheel when a pneumatic tire is mounted on said rim, wherein said assembly includes an outboard flange with a terminal, outer edge, and an ornamental overlay disposed adjacent and covering at least part of an outboard face of said metal wheel backbone, said overlay comprising a body of resilient plastic urethane material permanently affixed to said metal wheel backbone, the outboard face of said overlay being exposed to view from the outboard side of said wheel and having a contour differing from the contour of the covered part of the outboard face of said metal wheel backbone and providing a decorative contour over at least said wheel disc, said disc having a central aperture and wheel mounting fastener holes therein, said overlay having apertures including an internal surface registering coaxially with said disc central aperture and holes and defining a central cavity in said body adapted to receive a wheel hub and mounting parts therein, the improvement wherein, said outer edge on the outboard flange of said metal wheel backbone has a contour which diverges from a radially outward portion thereof in an axially inward direction to a radially inward portion thereof, such that said outer edge is oriented generally at an acute angle with respect to the axial centerline of said wheel, and said overlay has a smooth, skinned, mold-formed exterior surface at said outboard face, and a radially outwardlymost portion overlying at least a portion of said outboard flange edge, which portion is formed integrally with said overlay, and has a smooth, skinned, mold-formed exterior surface that is continuous with and blends into said exterior surface at said outboard face of said overlay, thereby avoiding trim cuts and rough edges on said smooth, skinned mold formed exterior surface of said overlay which result in exposing an interior cellular construction of said resilient plastic urethane material.

2. A composite styled wheel as set forth in claim 1, wherein:
said exterior surface of said overlay is covered by a layer of paint.

3. A composite styled wheel comprising:
a wheel defining an outboard face and including an outboard flange, said outboard flange including a terminal outer edge;
an overlay permanently adhered to said outboard face of said wheel, said overlay having a generally smooth skinned mold formed exterior surface and an interior cellular construction, said overlay covering a substantial portion of said outboard face of said wheel including covering at least a portion of said terminal outer edge of said outboard flange with a smooth skinned mold formed overlay outer portion, said smooth skinned mold formed exterior surface of said overlay outer portion being continuous with and blending with said smooth skinned mold formed exterior surface of said overlay covering said substantial portion of said outboard face of said wheel thereby avoiding trim cuts and rough edges on said smooth skinned mold formed exterior surface of said overlay outer portion so as not to expose said interior cellular construction of said smooth skinned mold formed overlay outer portion.

4. The composite styled wheel according to claim 3 wherein said wheel includes a central piloting aperture surrounded by a plurality of fastener holes.

5. The composite styled wheel according to claim 3 wherein said wheel includes a plurality of windows.

6. The composite styled wheel according to claim 3 wherein said wheel is a drop center wheel.

7. The composite styled wheel according to claim 3 wherein said overlay covers the entire outer edge of said outboard flange of said wheel.

8. The composite styled wheel according to claim 3 wherein said overlay is painted.

9. The composite styled wheel according to claim 3 wherein said overlay is constructed form a plastic urethane material.

10. The composite styled wheel according to claim 3 wherein said wheel is constructed from steel.

11. The composite styled wheel according to claim 3 wherein said wheel is constructed from aluminum.

12. The composite styled wheel according to claim 3 wherein said terminal, outer edge has a radially outermost side and a radially innermost side, said terminal outer edge diverging from said radially outermost side in an axially inward direction to said radially innermost side such that terminal outer edge is oriented at an acute angle with respect to an axial centerline of said wheel.

13. The composite styled wheel according to claim 3 wherein said acute angle is in the range from about 5 degrees to about 20 degrees.

* * * * *